United States Patent
Liu et al.

(10) Patent No.: US 9,451,308 B1
(45) Date of Patent: Sep. 20, 2016

(54) DIRECTED CONTENT PRESENTATION

(75) Inventors: Zhenyu Liu, San Jose, CA (US); Yong Yao, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/556,117

(22) Filed: Jul. 23, 2012

(51) Int. Cl.
*H04H 60/32* (2008.01)
*H04N 21/262* (2011.01)

(52) U.S. Cl.
CPC .............................. *H04N 21/26241* (2013.01)

(58) Field of Classification Search
CPC ................................................ H04N 21/26241
See application file for complete search history.

(56) References Cited

U.S. PATENT DOCUMENTS

| | | |
|---|---|---|
| 2003/0021441 A1 | 1/2003 | Levy et al. |
| 2005/0058319 A1 | 3/2005 | Rhoads et al. |
| 2007/0055500 A1 | 3/2007 | Bilobrov |
| 2007/0250716 A1 | 10/2007 | Brunk et al. |
| 2008/0049704 A1 | 2/2008 | Witteman et al. |
| 2008/0066098 A1 | 3/2008 | Witteman et al. |
| 2008/0256115 A1 | 10/2008 | Beletski et al. |
| 2008/0271070 A1* | 10/2008 | Kanojia et al. ................ 725/32 |
| 2008/0276266 A1* | 11/2008 | Huchital et al. ................ 725/32 |
| 2009/0041418 A1 | 2/2009 | Candelore et al. |
| 2009/0044233 A1 | 2/2009 | Brandt et al. |
| 2009/0063277 A1 | 3/2009 | Bernosky et al. |
| 2010/0119208 A1* | 5/2010 | Davis et al. .................... 386/83 |
| 2010/0205222 A1 | 8/2010 | Gajdos et al. |
| 2011/0238192 A1* | 9/2011 | Shah et al. ...................... 700/94 |
| 2011/0289098 A1* | 11/2011 | Oztaskent et al. ............ 707/769 |
| 2013/0036011 A1* | 2/2013 | Roberts et al. ............ 705/14.58 |

FOREIGN PATENT DOCUMENTS

| | | |
|---|---|---|
| JP | 2009-303120 | 12/2009 |
| WO | WO 2009/036435 | 3/2009 |
| WO | WO 2009/100093 | 8/2009 |

OTHER PUBLICATIONS

DG Announces Pioneering Dual-Screen Video Ad Platform. [online], [retrieved on Jun. 15, 2012], Retrieved from the Internet <URL: http://www.dgit.com/our-company/news-pr/dg-announces-pioneering-dual-screen-video-ad-platform>, 1 page.
Authorized officer Inigo Deane, Extended European Search Report in Application No. EP 11 16 6420.7, mailed Aug. 5, 2011, 7 pages.
Casey et al., "Content -Based Music Information Retrieval: Current Directions and Future Challenges," Proceedings of the IEEE, 96(4):668-696.

(Continued)

*Primary Examiner* — Oschta Montoya
(74) *Attorney, Agent, or Firm* — Foley & Lardner LLP; John D. Lanza

(57) ABSTRACT

Methods, systems, and apparatus, including computer programs encoded on computer storage media, for content presentation. One of the methods includes determining current programming being presented to a user from a first device, wherein the determining includes receiving information from the first device associated with the current programming being presented; determining one or more sponsored content items to provide to a second device, wherein the one or more sponsored content items are identified as associated with the current programming including determining that one or more presentation criteria as specified by a respective sponsored content provider have been satisfied; and providing the one or more sponsored content items to the second device.

16 Claims, 6 Drawing Sheets

(56) References Cited

OTHER PUBLICATIONS

Office Action issued in Japanese Application No. 2011-111540 on Apr. 6, 2015, 6 pages (with English translation).

"Gracenote Entourage: the ACR TV platform has a name!" Published Jan. 10, 2012. http://www.engadget.com/2012/01/10/gracenote-encourage-platform/.

* cited by examiner

DIRECTED CONTENT PRESENTATION

BACKGROUND

This instant specification relates to content presentation.

Content providers can provide content including sponsored content. For example, advertisers provide advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application. Other forms of sponsored content can be used.

SUMMARY

This specification describes technologies relating to content presentation.

Many users of mobile user devices, for example, mobile phones and tablets, often use their devices while simultaneously watching television. They may do so to multi-task, to relieve boredom, or to escape the commercials that appear during a television show. During this time, when the users interact with their mobile devices, they may encounter mobile display ads e.g., on web pages or mobile apps. If it is known by the mobile device, or by a server system that serves the mobile device, what programming is currently being presented on the television, then ads and/or other sponsored content that are more interesting or relevant to the user can be provided.

Content sponsors (e.g., advertisers) can elect to direct sponsored content items to users in this type of multi-device setting, such as through a mobile display ad serving system. For example, ads can be directed to all mobile users who are currently watching TV or a specific TV channel, have just finished watching a particular television show, or who, in the past ten minutes, have seen a specific version of a TV ad promoting the content sponsor's product.

To enable the directing of sponsored content in this way, mobile and tablet devices can passively or actively communicate with the devices involved in playing TV programs, for example, a television set, a set-top box, a smart TV console, or some other device capable of presenting programming. Through communication with the device presenting programming, the mobile device can accurately identify whether it is within close proximity of TV programming, and what TV program or TV commercial is currently being shown.

One example communication method is the use of audio patterns embedded in TV programs and TV commercials. Such audio patterns can use, for example, audio frequencies that, while hardly discernible to human ears, are distinctive enough for mobile or tablet devices to accurately identify current programming. For example, each audio pattern can be associated with a unique identifier. The audio patterns can be detected, for example, using systems completely implemented on the mobile or tablet device, or through the interaction between the mobile/tablet devices and servers on the network capable of identifying the audio patterns.

Another example communication method involves the use of smart TV consoles or TV-embedded solutions that are able to accurately identify the current TV program or TV commercial being played. For example, the communication can use a predefined protocol allowing mobile or tablet devices to query such identification results.

Users can be provided with privacy settings or other tools to partially or fully opt out of such communications between their mobile/table devices and their TV devices, and the usage of such communication for serving them sponsored content. For example, users may specify that some or all of their mobile devices can participate. Other opt out settings may be possible, e.g., by category (e.g., sports), time of day, specific sponsored content provider, and so on. When content is provided to a mobile device, e.g., based on current programming on a nearby TV, the content can be annotated in some way so as to explain its source.

Sponsored content providers can be provided with interfaces to view a database of TV programs and/or TV commercials that mobile and tablet devices can detect using the communication methods described herein. Sponsored content providers may use this information to specify mobile ad serving criteria on the basis of one or more individual TV programs and/or one or more TV commercials. Additionally, the sponsored content providers can apply temporal constraints regarding the relationship between the serving of a TV program or a TV commercial and the serving of sponsored content items, e.g., to serve the sponsored content item to the user device after five minutes when the TV program "XYZ" starts, or to serve the sponsored content item at the same time the TV commercial for "Product W" is aired. Reports can be available to sponsored content providers that identify and summarize the impressions their sponsored content items have been made based on one or more specified presentation criteria.

TV content providers, such as cable channels or networks, can list their content in a database and establish communication signals within their content that can be detected by mobile and tablet devices when they are being played. For example, they can choose to embed unique inaudible frequencies, or identify their content to the smart TV devices using unique IDs.

A serving system can serve a sponsored content item directed to a user device, for example, a mobile or tablet device, e.g., when a device has positively identified the content currently being played on a nearby TV and all temporal constraints of the presentation criteria have been satisfied. When multiple sponsored content items are available, each of which with satisfied presentation criteria, auctions can be run to determine one or more winning sponsored content items to provide.

Sponsored content providers and/or TV content providers can be charged for presentation of their content based on a predetermined payment model, e.g., cost per mille (thousand) impressions (CPM), cost per click (CPC), cost per action (CPA), or other models. Amounts can be paid to the entity providing the serving platform, and to the owner of the TV program based on a predetermined revenue share, e.g., if a specific contract has been established between the TV program owner and the sponsored content provider.

In general, one innovative aspect of the subject matter described in this specification can be embodied in methods that include the actions of determining current programming being presented to a user from a first device, wherein the determining includes receiving information from the first device associated with the current programming being presented; determining one or more sponsored content items to provide to a second device, wherein the one or more sponsored content items are identified as associated with the current programming including determining that one or more presentation criteria as specified by a respective sponsored content provider have been satisfied; and providing the one or more sponsored content items to the second device.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining current programming being presented includes receiving, from the first device, a programming identifier and using the programming identifier to determine the current programming. Determining the current programming includes receiving an audio fingerprint from the first device associated with the current programming. The method further includes matching the audio fingerprint to a programming database. Determining that one or more presentation criteria have been satisfied includes determining whether temporal constraints are satisfied for particular sponsored content items. Determining that one or more presentation criteria have been satisfied includes determining whether programming constraints are satisfied for particular sponsored content items. The programming constraints include a programming category. The programming constraints include a specified program. The method further comprises generating reports for sponsored content providers based on sponsored content items provided for particular determined programming.

In general, another innovative aspect of the subject matter described in this specification can be embodied in methods that include the actions of obtaining a database of programming content; providing an interface for selecting particular broadcast programming content; receiving selections of broadcast programming content from a sponsored content provider; and using the selections when determining sponsored content items to provide to users.

The foregoing and other embodiments can each optionally include one or more of the following features, alone or in combination. Selecting particular broadcast programming content includes selecting individual programming. Selecting particular broadcast programming content includes selecting one or more programming categories. Selecting particular broadcast programming content includes selecting one or more programming demographics. The method further comprises providing reports to the sponsored content provider based on sponsored content items provided for the selected broadcast programming and receiving input modifying programming selections based on reports.

The systems and techniques described here may provide one or more of the following advantages. Sponsored content items can be provided that are directed to particular content being broadcast in proximity to a user device. This can increase the likelihood of providing relevant sponsored content items to the user. Additionally, for users who are interested in a program or ad on television and want to learn more, a mobile ad provided on a second device can provide more information or links to external resources. For example, users can watch a promotion video, browse a rich media ad, or click a mobile ad that loads up a product web page. In another example, mobile ads provided in response to broadcast content can provide conversion opportunities for the user, e.g., allowing the user to click to call or link to a mobile web page to place an order.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
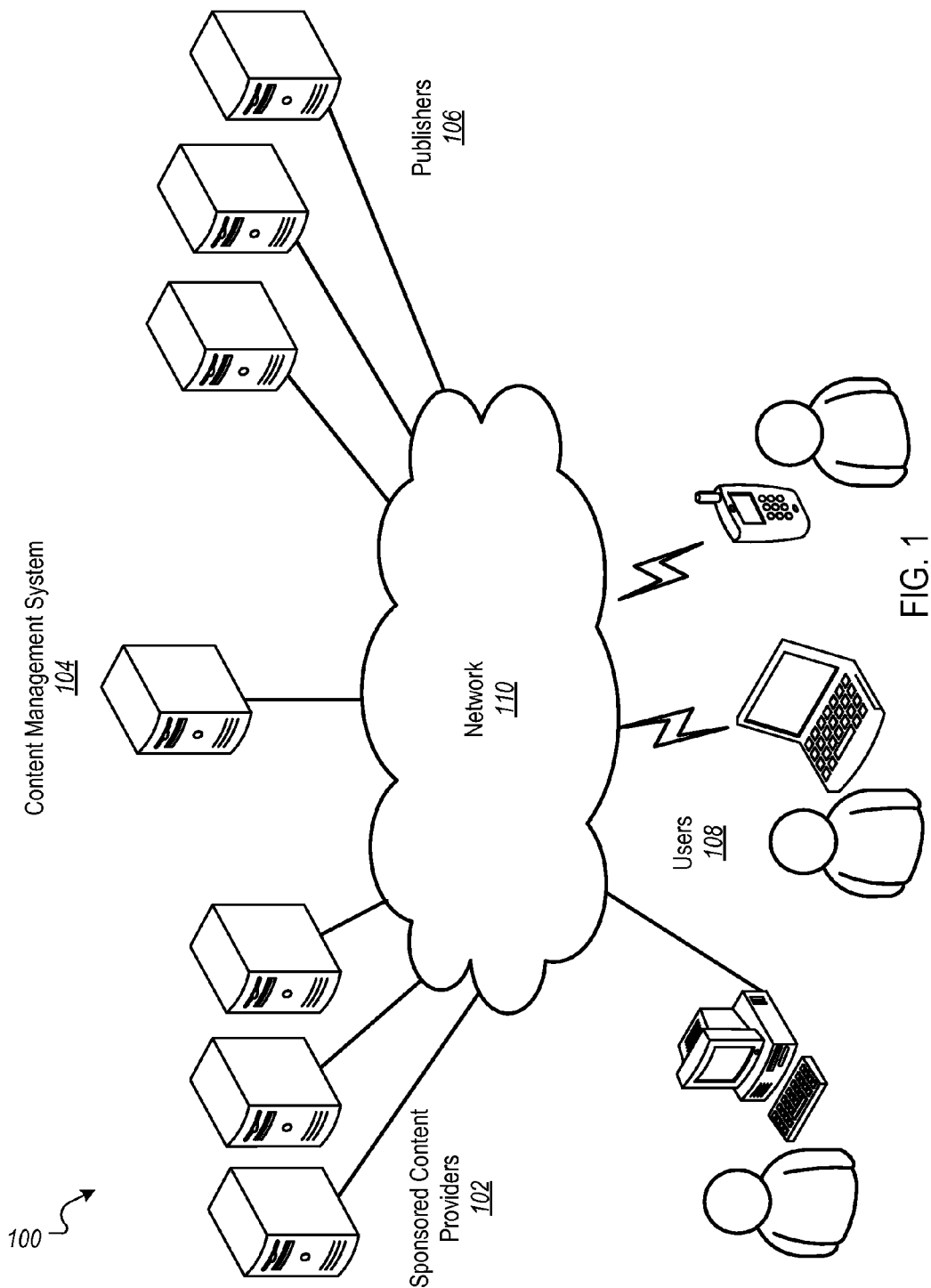
FIG. 1 is a block diagram of an example content presentation system.

FIG. 1 is a block diagram of an example content presentation system 100. In some implementations, one or more sponsored content providers 102 (e.g., advertisers) directly, or indirectly, enter, maintain, and log ad information in a content management system 104 (e.g., an advertising management system). Though reference is made to advertising, other forms of content, including other forms of sponsored content, can be delivered by the system 100. The sponsored content can be in the form of graphical ads, for example, banner ads, text only ads, image ads, and barcode ads (e.g., ads that include one or more barcodes used, for example, in ad redemption), audio ads, video ads, animated ads, ads combining one or more of any of such components, etc. The sponsored content can also include embedded information, such as links, meta-information, and/or machine executable instructions. One or more publishers 106 may submit requests for sponsored content to the system 104. The system 104 responds by sending sponsored content to the requesting publisher 106 for placement on or association with one or more of the publisher's content items (e.g., web properties, mobile applications). Example web properties can include web pages, television and radio advertising slots, or print media space. Example mobile applications can include media players, games, messaging clients, and other applications configured to execute on phones, tablets, and other mobile computing devices.

Other entities, such as users 108 and the sponsored content providers 102, can provide usage information to the system 104, for example, whether or not a conversion (e.g., a purchase or other interaction) or a click-through related to sponsored content (e.g., a user has selected an ad) has occurred. This usage information can include measured or observed user behavior related to sponsored content items that have been served. The system 104 may perform financial transactions, for example, crediting the publishers 106 and charging the sponsored content providers 102 based on the usage information.

A network 110, such as a local area network (LAN), wide area network (WAN), the Internet, one or more telephony networks or a combination thereof, connects the sponsored content providers 102, the system 104, the publishers 106, and the users 108.

One example publisher 106 is a general content server that receives requests for content (e.g., articles, discussion threads, music, video, graphics, search results, web page listings, information feeds, etc.) and retrieves the requested content in response to the request. The content server can submit a request for sponsored content to an advertisement server in the system 104. Alternatively, a request for sponsored content can be embedded in content from the publisher being rendered on a user device such that the user device (e.g., a browser) submits the request. The request can include a number of sponsored content items desired. The request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser combines the requested content with one or more of the sponsored content items provided by the system 104. The combined content and sponsored content items can be sent/rendered to the users 108 that requested the content for presentation in a viewer (e.g., a browser or other content display system). The content server can transmit information about the sponsored content items back to the advertisement server, including information describing how, when, and/or where the sponsored content items are to be rendered (e.g., in HTML or based on scripting). In some implementations, the content and sponsored content items are combined separately. For example, content can be rendered while waiting for sponsored content items to be received and incorporated into the content.

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for sponsored content (e.g., ads) to the system 104. The request may include a number of sponsored content items desired. This number can depend, for example, on the search results, the amount of screen or page space occupied by the search results, the size and shape of the sponsored content items, etc. The request for sponsored content may also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

Another example publisher 106 is an application publisher. An application publisher can develop applications for a variety of uses on one or more computing platforms. A mobile application is an application specifically designed for operation on a mobile device (e.g., a smart phone). For mobile platforms, network efficiency and computational efficiency may be of importance, based on the resources available to applications executing on mobile platforms.

The mobile applications developed by the application publisher can submit a request for sponsored content to the system 104, e.g., for ads to display while a user is interacting with or viewing the application. The application may periodically request additional sponsored content from the system 104, either as a single sponsored content item or a batch of sponsored content items. Each sponsored content item can be displayed for a period of time determined by a refresh rate determined for the application, after which time the sponsored content item can be replaced by a new sponsored content item.

In some implementations, the content management system 104 can use an auction process to select sponsored content items from the sponsored content providers 102. For example, the sponsored content providers 102 may be permitted to select, or bid, an amount the advertisers are willing to pay for each presentation of or interaction with (e.g., click) a sponsored content item, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, sponsored content items can be selected and ranked for presentation.

The search service can combine the search results with one or more of the sponsored content items provided by the system 104. This combined information can then be forwarded to the users 108 that requested the content. The search results can be maintained as distinct from the sponsored content items, so as not to confuse the user between, e.g., paid ads and presumably neutral search results.

In some implementations, one or more publishers 106 submit requests for sponsored content to the content management system 104. The system 104 responds by sending sponsored content items to the requesting publisher 106 for placement on one or more of the publisher's web properties, e.g., websites and other network-distributed content, that are relevant to the web property. For example, if a publisher 106 publishes a sports-related web site, the advertising management system can provide sports-related sponsored content items to the publisher 106. In some implementations, the requests can instead be executed by devices associated with the user 108, e.g., by the execution of a particular script when the publisher's web page is loading on a client device. For example, content being loaded by a user's browser can include scripts indicating a request for sponsored content is to be made to the content management system 104. The sponsored content items are requested and can be integrated into the publisher content separately as received or display of the content can be halted until the requested sponsored content items are received.

Figure 2:
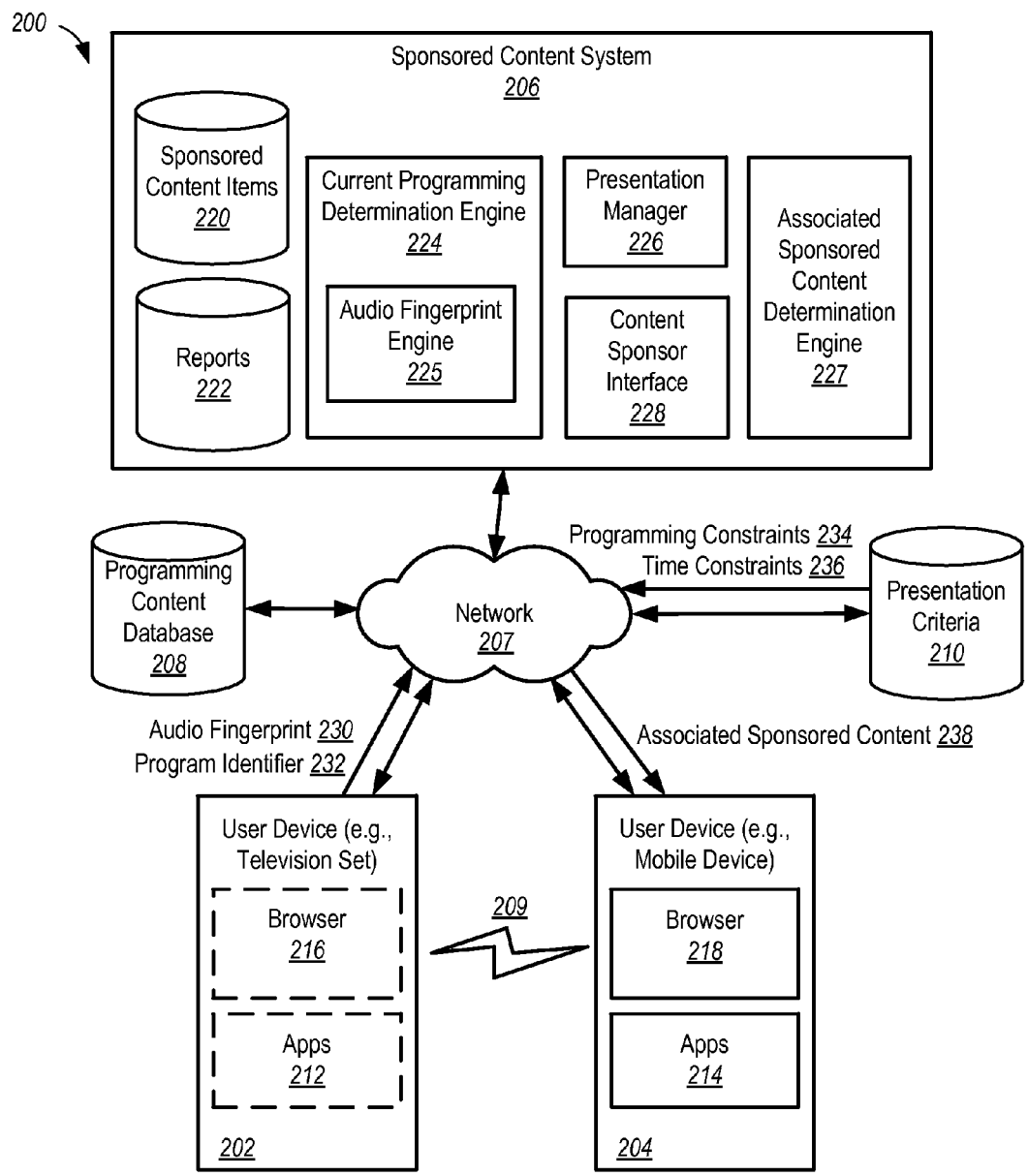
FIG. 2 shows an example system with two user devices and in communication with a sponsored content system that provides content to a second user device based on current programming presented on a first user device.

FIG. 2 shows an example system 200 with user devices 202 and 204 in communication with a sponsored content system 206 that provides content to the second user device 204 based on current programming presented on the first user device 202. Communication between user devices 202 and 204 and sponsored content system 206 can occur using a network 207. While user devices 202 and 204 may be various devices, for the purpose of this example, user device 202 can be a device that provides television content or other content, and user device 204 can be a device that provides sponsored content, e.g., that is related to content presented on user device 202.

Computer system 200 can include plural data stores, e.g., programming content database 208 and presentation criteria 210, each communicatively coupled to components of computer system 200 using network 207. Programming content database 208 can include information about programming content presentable on various devices. In some implementations, the information includes one or more of program identifiers, audio footprints, or other information. In addition to communicating through the network, inter-device communication 209 can occur between devices 202 and 204. For example, interaction between any two user devices can be used to determine current programming being presented on one device in order to present ads on the second device, such as by receiving an audio fingerprint or querying a program identifier. In some implementations, the inter-device communication 209 can include a Bluetooth connection, or communication can occur in other ways. Inter-device communication can be one-way or two-way. For example, one device can query another for information that is returned back to the requesting device (e.g., a request for a program identifier). In another example, a device can include a microphone for receiving audio from another device.

Presentation criteria 210 can include information that specifies which sponsored content is to be provided and criteria by which the content is to be presented, for example, based on current programming content presented on another device, e.g., a device in close proximity. For example, information can include programming constraints 234 that identify, for a particular first content, e.g., current programming, presented on user device 202, associated second content, e.g., a sponsored content item, to be presented on user device 204. The information can further include time constraints 236 that define, for example, a time range or limit, from identifying the particular first content, in which the second content is to be presented on the user device 204. For example, the presentation criteria 210 can specify that an ad for pizza is to be presented on a user's mobile phone if the user's television set or personal computer in close proximity to the mobile phone that is currently showing (or very recently has shown) a football game.

User devices 202 and 204 are general or specific use computer devices that may be used by, in this case, the same user or two different users. They may be any type of appropriate computer devices that are capable of displaying an application's graphical user interface and content items including sponsored content items such as ads to a user. User devices 202 and 204 may also be capable of presenting content such as television programming or other types of content from various sources. Examples of such user devices include, but are not limited to, mobile devices (e.g. smartphones and tablets), desktop computing devices (e.g. desktop, laptop, or server systems), and specialty computer devices (e.g. in-dash navigation and entertainment systems in an automobile, television media centers, televisions and set-top boxes). User devices 202 and 204 are also capable of communicating across the data network 207, which may include, but is not limited to, wide area networks (WANs), local area networks (LANs), the Internet, and cellular networks.

User devices 202 and 204 can execute applications 212 and 214, respectively. Some or all of the applications 212 and 214, in this case, have been downloaded and installed from one of the application markets or from other sources as well. For example, some applications 212 and 214 may be pre-loaded by a device manufacturer or downloaded directly from an application publisher website, etc. The user devices 202 and 204 include browsers 216 and 218, respectively. The browsers 216 and 218 may be applications like the applications 212 and 214, or they may be a part of the operating system of the user devices 202 and 204. Applications 212 and browser 216 can be optional, for example, if user device 202 is a TV that has no Internet connection.

The applications 212 and 214 and the browsers 216 and 218 can present content to a user. For example, applications 212 and 214 and the browsers 216 and 218 can present a graphical user interface to users to provide that user with a particular functionality. Example applications 212 and 214 can include, but are not limited to, news aggregators, games, productivity application, social networking applications, content browsers, and utility applications. The browsers 216 and 218 include web browsers, or other content browsers, that show documents to a user. One or more of the applications 212 and 214 and the browsers 216 and 218 can display sponsored content to a user. In some cases, the sponsored content is shown directly by the applications 212 and 214 or the browsers 216 and 218. In other cases, the sponsored content is included in a document or other data being displayed.

The sponsored content system 206 can include a presentation manager 226. The presentation manager 226 can receive sponsored content requests from user device 204 and determine which content 220, e.g., one or more sponsored content items, to serve in response. The sponsored content requests may originate from, for example, the applications 214 or in response to rendering documents, e.g., web pages, from a publisher on the browsers 218. Alternatively, the sponsored content requests can be received from publishers requesting sponsored content items to be provided to a client and incorporated into publisher content being displayed on the browsers.

The presentation manager 226 can identify and rank the content 220 to be returned based on the requesting user device 204, the user of the requesting device 204, content being requested for presentation, and/or information in the request. For example, the presentation manager 226 can match sponsored content items 220 to sponsored content requests based on keywords in the ad request. In another example, the presentation manager 226 uses information about the user, to identify sponsored content items. In yet another example, the presentation manager 226 can send sponsored content items that are based on the specific application requesting the sponsored content, e.g., ads for products or services that may appeal to a typical user of the social application.

A current programming determination engine 224 can determine current programming that is being presented to a user on a device, e.g., determining that a football game is being presented on user device 202. Identification can occur, for example, using information received from the user device 202 that is associated with the current programming being presented. The information can include, for example, an audio fingerprint 230 and/or a program identifier 232 received from the user device 202. Upon receipt of these or other information, current programming determination engine 224 can determine the current programming in various ways. For example, if an audio fingerprint 230 is received, an audio fingerprint engine 225 can process the signal and identify one or more matching signals in programming content database 208. In some implementations, current programming determination engine 224 receives a program identifier 232 from user device 202. The program identifier 232 can be used to look up the corresponding program content in programming content database 208.

An associated sponsored content determination engine 227 can determine one or more sponsored content items to provide to a second device (e.g., device 204). The determination can be made, for example, based at least in part on the current programming determined by the current programming determination engine 224. For example, associated sponsored content determination engine 227 can identify one or more sponsored content items as being associated with the current programming, including determining that one or more presentation criteria have been satisfied. For example, if the current programming being presented on user device 202 is a football game, then associated sponsored content determination engine 227 can determine that a sponsored content item for pizza delivery is associated sponsored content.

In some implementations, to make the determination of associated sponsored content, associated sponsored content determination engine 227 accesses programming constraints 234 from presentation criteria 210. The programming constraints 234, for example, can be the result of a sponsored content provider specifying that a pizza ad is to be presented on a second device if current programming on a first device, in close proximity to the second device, is related to football.

A content sponsor interface 228 can provide an interface, e.g., a graphical user interface, for selecting particular broadcast programming content. For example, content sponsor interface 228 can access programming content database 208 to present information about available programming to the content sponsor. Selections made by the content sponsor can be stored as presentation criteria 210 and subsequently used when determining sponsored content items to provide to users. For example, the content sponsor can select particular broadcast programming content by selecting individual programming, one or more programming categories, one or more programming demographics, or in other ways.

In some implementations, sponsored content system 206 generates reports 222 that identify sponsored content items that are to be provided in association with particular current programming. For example, sponsored content providers (e.g., sponsored content providers 102) can use the reports 222 to see which of their sponsored content items (e.g., a pizza ad) have been presented on a second user device in association with current programming on a first device. The report 222 in this example may indicate that the pizza ad can be selected to be presented on a mobile phone if another user device (e.g., a television or home computer) in close proximity is currently presenting a football game.

Figure 3:
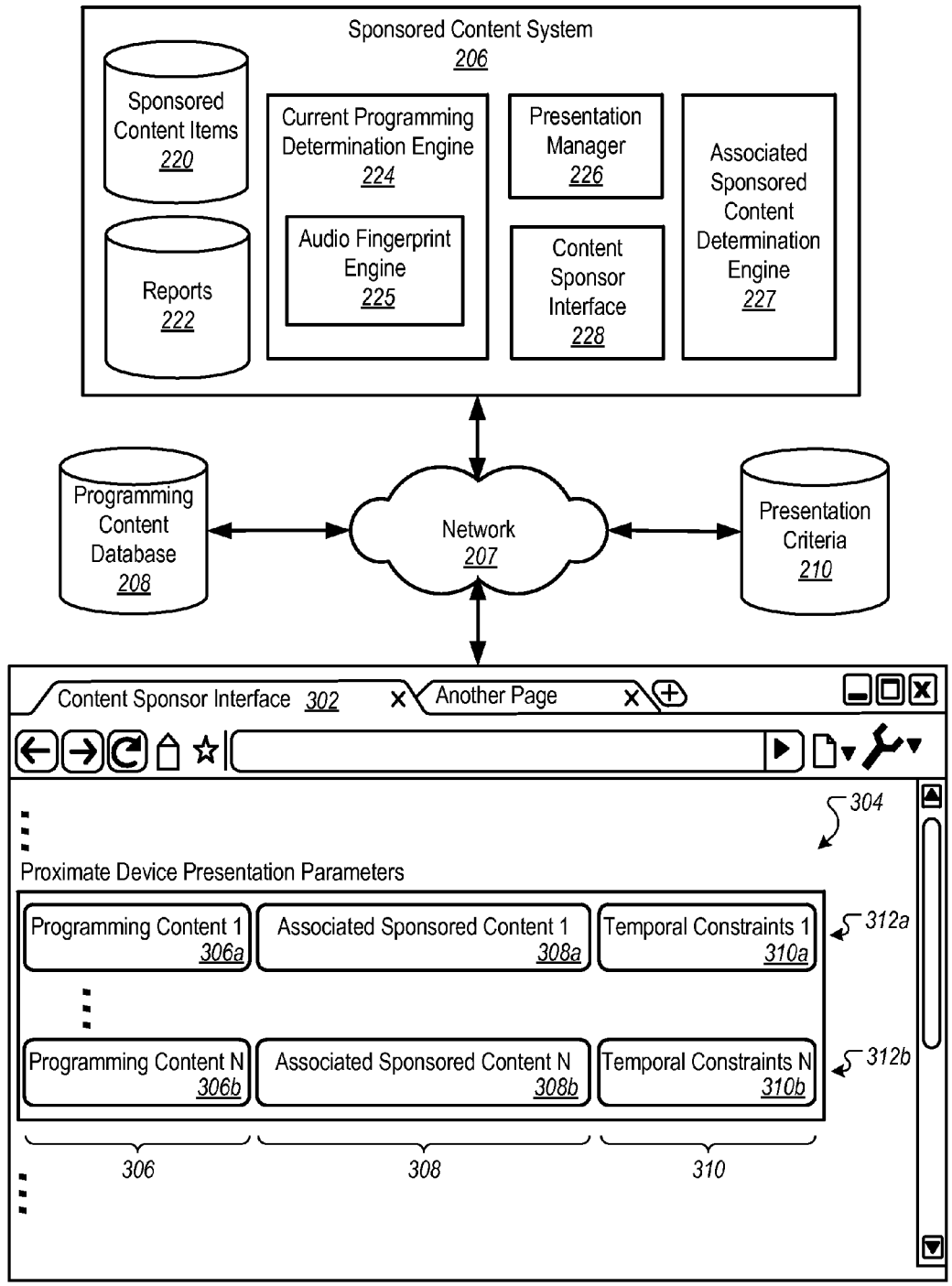
FIG. 3 shows an example content sponsor interface for specifying presentation criteria for sponsored content to be presented based on current programming.

FIG. 3 shows an example content sponsor interface 302 for specifying presentation criteria 304 for sponsored content to be presented based on current programming. For example, a content sponsor can use the content sponsor interface 302 to specify content that is to be provided to a user's second device based on content presented on the user's first device. In an example use of parameters set in the content sponsor interface 302, content provided on user device 204 (e.g., a mobile device) can be based on content presented on user device 202 (e.g., a television set). The presentation criteria 304 can be in addition to other presentation criteria not shown in FIG. 3, e.g., other parameters that content sponsors use to set up a campaign, e.g., for ads.

In some implementations, the presentation criteria 304 can include programming content 306 (e.g., corresponding to current content presented on the user's first device), associated sponsored content 308 (e.g., the associated content to be presented on the user's second device), and temporal constraints 310 (e.g., a maximum time in which presentation is to occur). Rows 312a and 312b, for example, can each include specific entries for programming content 306, associated sponsored content 308, and temporal constraints 310. For example, if the sponsored content provider sells pizza, the associated sponsored content 308a may identify ad creatives associated with pizza, the programming content 306a may identify football, and the temporal constraints 310a may identify "anytime during the football game". As a result, when the parameters are subsequently used when serving content, creatives associated with pizza may be selected to be presented to the users on mobile devices in close proximity to televisions or other user devices showing the football game. The content sponsor can further set up other parameters using, e.g., row 312b and other rows. For example, associated sponsored content 308b may also identify pizza creatives, but the programming content 306b and temporal constraints 310b may be different, e.g., for presenting pizza ads during the first hour of programming related to stock car races.

In some implementations, demographics and/or other constraints can be included with associated sponsored content 308, or as a separate parameter. For example, the presentation criteria 304 can include controls for specifying demographics, such as age=25-34, gender=male, as constraints associated with associated sponsored content 308. As a result, pizza ads would only be directed to male users, age 35-44, and not to users outside of that demographic.

Figure 4:
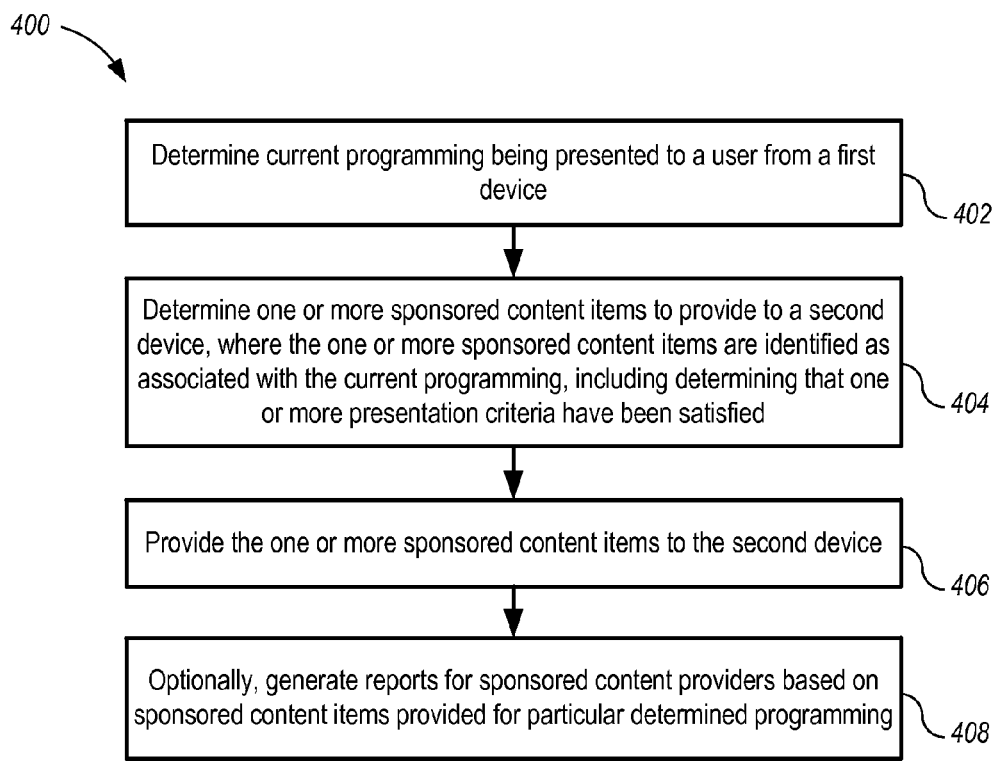
FIG. 4 shows a flow diagram of an example process for providing content on a user's second device based on content provided on the user's first device.

FIG. 4 shows a flow diagram of an example process 400 for providing content on a user's second device based on content provided on the user's first device. In some implementations, the process 400 may be performed by, for example, the sponsored content system 206. As such, the example process 400 will be described in terms of the system that performs the process 400. However, another system or groups of systems may also perform the process 400.

The system determines current programming being presented to a user from a first device 402. For example, current programming determination engine 224 can determine that a football game is the current programming being presented on user device 202. In some implementations, determining the current programming being presented can include receiving, from the first device, information that is associated with the current programming being presented. For example, the system can receive an identifier of currently-presented programming or an audio fingerprint. The system can match the audio fingerprint engine to audio fingerprints of programs stored in a programming content database.

In some alternative implementations, using inter-device communication techniques, user device 202 can provide program identifier 232 to another device, e.g., user device 204. As such, the current programming determination engine 224 can use the received program identifier 232 to look up the current programming in programming content database 208.

In some other implementations, determining the current programming being presented includes receiving, from a second device, an audio fingerprint identified from audio received from the first device and using the audio fingerprint to determine the current programming. For example, the audio fingerprint engine 225 can match the audio fingerprint 230 of audio received from user device 202 to audio fingerprints of programs stored in programming content database 208.

Audio fingerprints, for example, can include unique patterns of sound frequencies, typically inaudible to humans, that are embedded into sound tracks of television programming or provided in other ways. The audio fingerprints can be located, for example, at the beginning of programming and at various other locations in the programming, including at regular intervals. The length of audio fingerprints may be less than a second long, but long enough to be detected. In some implementations, user device 204 (e.g., the user's mobile device) can intercept audio signals and pass the signals to the sponsored content system 206 for identification, e.g., using the unique patterns. Other ways or combinations of ways of determining the current programming can be used. In some implementations, requests for content from a device can include audio fingerprints received from other nearby devices that may indicate current content presented on the other devices.

The system determines one or more sponsored content items to provide to the second device 404. The one or more sponsored content items are identified as associated with the current programming, including determining that one or more presentation criteria as specified by a respective sponsored content provider have been satisfied. For example, associated sponsored content determination engine 227 can use the identified current programming to look up associated sponsored content to be provided by accessing information in presentation criteria 210.

In some implementations, determining that one or more presentation criteria have been satisfied includes determining whether temporal constraints are satisfied for particular sponsored content items. For example, the temporal constraints can indicate that the associated sponsored content (e.g., a pizza ad) should be provided within five minutes after the start of the current programming (e.g., the football game). Other examples of temporal constraints can include presenting associated sponsored content during the time that the current programming is occurring, or specific time periods, such as no more than twenty minutes after the current programming has stopped. Other temporal constraints are possible.

In some other implementations, determining that one or more presentation criteria have been satisfied includes determining whether programming constraints are satisfied for particular sponsored content items. Example programming constraints include one or more programming categories (e.g., sports, news, sitcom, etc.), specified programs (e.g., "Sports Summary at 9," "News at 10, "What's-His-Name's Place," etc.), or other constraints (e.g., audience demographics, length of show, timeslot of program, etc.) that can be used to identify or characterize programs.

The system provides the one or more sponsored content items to the second device 406. For example, presentation manager 226 can provide sponsored content 220 in response to a request for content from user device 204. The sponsored content 220 selected can include the associated sponsored content determined by associated sponsored content determination engine 227.

The system optionally generates reports for sponsored content providers based on sponsored content items provided for particular determined programming 408. For example, sponsored content providers can obtain reports that indicate their sponsored content items that have been provided in association with current programming, e.g., 1437 impressions of pizza ads provided as sponsored content associated with a currently-watched football game. Sponsored content providers may use this information, for example, to change presentation criteria 210 for subsequent use.

Although a particular number, order, and type of operations are described here, different numbers, orders, and types of operations are possible. For example, a set of users can be identified who are likely or possibly watching the same TV channels, TV programs and/or TV ads. The identified set of users and corresponding current programming can be used to select sponsored content using a combination of temporal and geographical constraints. For example, if a soft drink company is running a TV ad during a football game's time slots, the content sponsors could also create a mobile ad campaign directed to mobile devices and reserve mobile traffic to be timed and coordinated with the showing of their TV ads.

Figure 5:
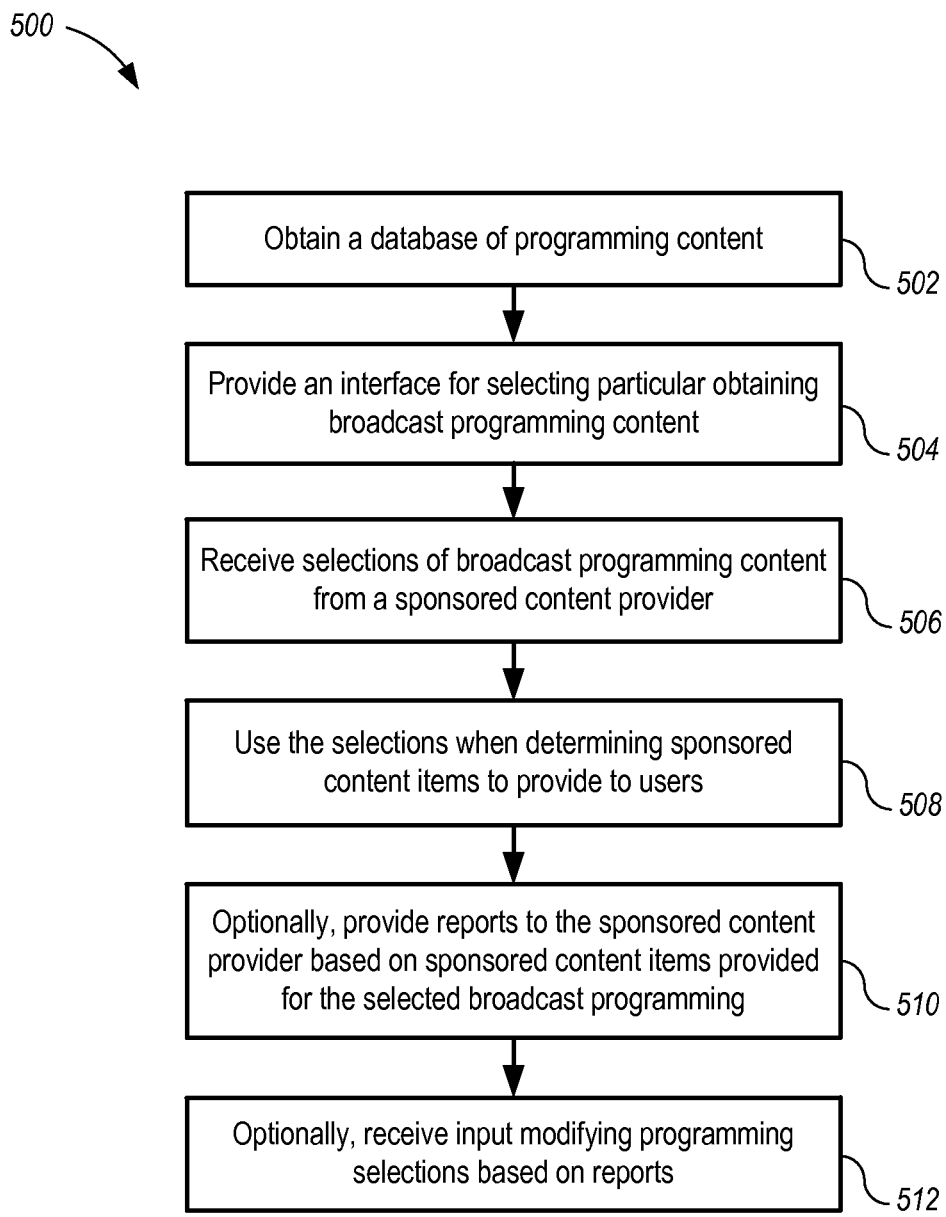
FIG. 5 shows a flow diagram of an example process for an interface for specifying presentation criteria.

FIG. 5 shows a flow diagram of an example process 500 for an interface for specifying presentation criteria. In some implementations, the process 500 may be performed by, for example, the content sponsor interface 228 within computer system 200. As such, the example process 500 will be described in terms of a system that performs the process 500. However, another system or groups of systems may also perform the process 500.

The system obtains programming content information 502. For example, for example content sponsor interface 228 can access information about programming from a programming content database, e.g., programming content database 208, or from other sources. The information can include the types of programming (e.g., football games) upon which the content sponsor wishes to provide associated sponsored content items (e.g., pizza ads). In some implementations, the information can include specific programs, demographics associated with the programming, or other information for categorizing programming content.

The system provides an interface for selecting particular broadcast programming content 504. For example, content sponsor interface 228 can provide content sponsor interface 302.

The system receives selections of broadcast programming content from a sponsored content provider 506. For example, the content sponsor can provide or change presentation criteria 304, as described above with reference to FIG. 3. The information that the content sponsor provides can be stored as presentation criteria 210.

In some implementations, selection of particular broadcast programming content includes selections of individual programming. For example, the content sponsor can use the content sponsor interface 302 to identify associated programming content 306 by selecting individual titles of programs, e.g., from a list, by entering a name, and/or by searching on a partial title. In some other implementations, selection of a control associated with associated programming content 306a can cause one or more other controls to be presented to the content sponsor by which the individual titles can be identified and/or specified.

Selection of particular broadcast programming content can include selections of one or more programming categories. For example, the content sponsor can use a control associated with associated programming content 306a to select one or more categories, e.g., sports, entertainment, game shows, drama, sitcoms, etc. In some implementations, an entire selected category can be designated as a selection of associated programming content 306a, or the category can be used to select individual titles from the category.

Selection of particular broadcast programming content can include selections of one or more programming demographics. For example, the content sponsor can make a selection that represents "select content that appeals to males with ages between 35 and 44." Other selection techniques can be used, and combinations of techniques can be used to generate multiple selections of particular broadcast programming content.

The system uses the selections when determining sponsored content items to provide to users 508. For example, when presentation manager 226 receives content requests (e.g., from user device 204), presentation manager 226 can select which content 220 to serve in response based at least in part on information from presentation criteria 210.

The system can provide reports to the sponsored content provider based on sponsored content items provided for the selected broadcast programming 510. For example, reports 222 can be presented to content sponsors, who can use the reports to view statistics regarding their sponsored content (e.g., a pizza ad) that have been presented on a second user device in association with current programming on a first device.

Input modifying programming selections based on reports can be received 512. For example, based on information provided in reports 222, content sponsors can make changes to presentation criteria 210, e.g., using content sponsor interface 302.

Although a particular number, order, and type of operations are described here, different numbers, orders, and types of operations are possible. For example, other interfaces can be provided that content providers can use to fine-tune their campaign in order to take advantage of situations in which current programming may be presented on a user's first device while additional sponsored content can be presented on one or more second devices.

Figure 6:
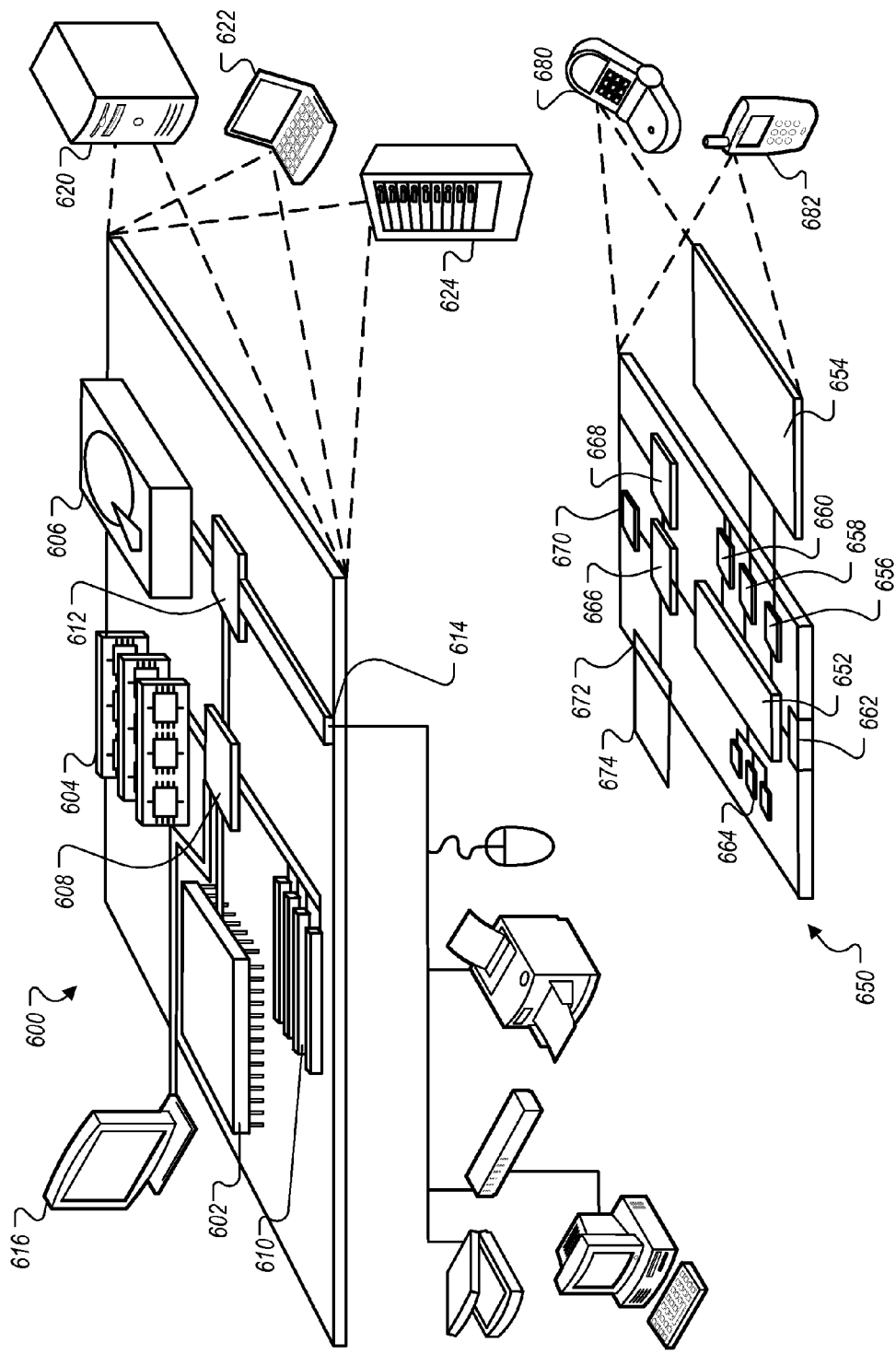
FIG. 6 shows an example of a computing device and a mobile computing device that can be used in connection with computer-implemented methods and systems described in this document.

FIG. 6 shows an example of a computing device 600 and a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method executed on a server system comprising:
receiving data from a first device comprising an indication of a proximity to a second device playing current programming and an audio fingerprint obtained by the first device from the playing current programming;
determining, using the received data from the first device, the current playing programming being presented to the user on the first device at the current time by locating a match to the audio fingerprint in a programming content database;
determining an end time of the current playing programming;
determining a sponsored content item to provide to the first device based on at least the playing current programming, presentation criteria of the sponsored content item, and programming constraints of the sponsored content item, wherein the presentation criteria includes a temporal constraint relative to the end time of the current playing programming requiring sending the sponsored content item prior to a specified amount of time after the end time of the current playing programming and the programming constraints include a programming category of the playing current programming; and
sending the sponsored content item to the first device at a time based on the presentation criteria.

2. The method of claim 1, wherein the temporal constraint requires sending the sponsored content item prior to the end time of the current playing programming.

3. The method of claim 1, wherein the programming category is selected from a group consisting of sports, news and sitcoms.

4. The method of claim 1, wherein the programming constraints include a specified program.

5. The method of claim 1, further comprising generating reports for content sponsors based on sponsored content items sent for particular presentation criteria.

6. The method of claim 1, wherein locating the match to the audio fingerprint in a programming content database provides the programming category of the playing current programming.

7. The method of claim 1, wherein the audio fingerprint is a unique pattern of sound frequencies typically inaudible to humans.

8. A system comprising:
one or more computers in a server system configured to perform operations comprising:
receiving data from a first device comprising an indication of a proximity to a second device playing current programming and a programming identifier obtained by the first device from the second device via near field communication;
determining, using the received-data from the first device, the current playing programming being presented to the user on the first device at the current time by locating a match to the programming identifier in a programming content database;
determining an end time of the current playing programming;
determining a sponsored content item to provide to the first device based on at least the playing current programming, presentation criteria of the sponsored content item, and programming constraints of the sponsored content item, wherein the presentation criteria includes a temporal constraint relative to the end time of the current playing programming requiring sending the sponsored content item prior to a specified amount of time after the end time of the current playing programming and the programming constraints include a specified program matching the playing current; and
sending the sponsored content item to the-first device at a time based on the presentation criteria.

9. The system of claim 8, wherein temporal constraint requires sending the sponsored content item prior to the end time of the current playing programming.

10. The system of claim 8, wherein the programming category is selected from a group consisting of sports, news and sitcoms.

11. The system of claim 8, wherein the temporal constraint requires sending the sponsored content item prior to the end time of the current playing programming.

12. The system of claim 8, further comprising generating reports for sponsored content sponsors providers based on sponsored content items sent for particular presentation criteria.

13. The system of claim 8, wherein the programming identifier is an audio fingerprint that includes unique patterns of sound frequencies typically inaudible to humans.

14. A non-transitory computer-readable storage medium encoded with a computer program instructions that when executed by one or more computers cause the one or more computers to perform operations comprising:
receiving data from a first device comprising an indication of a proximity to a second device playing current programming and an audio fingerprint obtained by the first device from the playing current programming;
determining, using the received-data from the first device, the current playing programming being presented to the user on the first device at the current time by locating a match to the audio fingerprint in a programming content database;
determining an end time of the current playing programming;
determining a sponsored content item to provide to the first device based on at least the playing current programming, presentation criteria of the sponsored content item, and programming constraints of the sponsored content item, wherein the presentation criteria includes a temporal constraint relative to the end time of the current playing programming requiring sending the sponsored content item prior to a specified amount of time after the end time of the current playing programming and the programming constraints include a programming category of the playing current programming; and sending the sponsored content item to the first device at a time based on the presentation criteria.

15. The computer storage medium of claim 14, wherein the temporal constraint requires sending the sponsored content item prior to the end time of the current playing programming.

16. The computer storage medium of claim 14, wherein the audio fingerprint is a unique pattern of sound frequencies typically inaudible to humans.

* * * * *